(12) United States Patent
Schiehlen et al.

(10) Patent No.: US 7,845,991 B2
(45) Date of Patent: Dec. 7, 2010

(54) APPARATUS FOR THE ELECTRICAL CONNECTION OF CELL ARRESTERS

(75) Inventors: Thomas Schiehlen, Altheim (DE); Martin Steinbach, Waiblingen (DE)

(73) Assignee: Behr GmbH & Co. KG, Stuttgart (DE)

( * ) Notice: Subject to any disclaimer, the term of this patent is extended or adjusted under 35 U.S.C. 154(b) by 0 days.

(21) Appl. No.: 12/570,056

(22) Filed: Sep. 30, 2009

(65) Prior Publication Data

US 2010/0081345 A1    Apr. 1, 2010

(30) Foreign Application Priority Data

Oct. 1, 2008    (DE) .................. 10 2008 049 852

(51) Int. Cl.
*H01R 11/09* (2006.01)

(52) U.S. Cl. ...................... 439/787; 439/500

(58) Field of Classification Search ............... 439/787, 439/500, 514; 429/158, 160
See application file for complete search history.

(56) References Cited

U.S. PATENT DOCUMENTS 4,683,180 A * 7/1987 Bish et al. .................. 429/130
5,938,488 A    8/1999 Wilmes
6,365,297 B1   4/2002 Wolczak et al.
2003/0215702 A1   11/2003 Tanjou et al.
2009/0239138 A1 *  9/2009 Chen et al. .................. 429/160

FOREIGN PATENT DOCUMENTS

DE   100 62 256 A1   7/2001
EP   0836242 A1   4/1998

* cited by examiner

*Primary Examiner*—Hae Moon Hyeon
(74) *Attorney, Agent, or Firm*—Muncy, Geissler, Olds & Lowe, PLLC

(57) ABSTRACT

An apparatus for the electrical connection of cell arresters is provided. The apparatus having a first contact element having a first guide device and a second guide device, the first guide device being designed to rest against a first cell arrester and the second guide device being designed to rest against a second cell arrester. The apparatus also comprises a second contact element having at least one first holding device and at least one second holding device, the at least one first holding device being designed to surround the first guide device and the first cell arrester and the at least one second holding device being designed to surround the second guide device and the second cell arrester.

12 Claims, 5 Drawing Sheets

APPARATUS FOR THE ELECTRICAL CONNECTION OF CELL ARRESTERS

CROSS-REFERENCES TO RELATED APPLICATIONS

This nonprovisional application claims priority under 35 U.S.C. §119(a) to German Patent Application No. 10 2008 049 852.1, which was filed in Germany on Oct. 1, 2008 and which is herein incorporated by reference.

BACKGROUND OF THE INVENTION

1. Field of the Invention

The present invention relates to an apparatus for an electrical connection of cell arresters and, in particular, of battery cell arresters.

2. Description of the Background Art

Battery cells that are used, for example, in vehicles, have cell arresters. To contact the battery, an electrical connection is required between the cell arresters. Electrical connectors are usually designed as cylindrical connectors, which are not suitable for cell arresters. EP 0 836 242 A1, which corresponds to U.S. Pat. No. 5,938,488, and which describes a clamping connection having a clamping screw. Due to the load placed on the arrester by the clamping screw, a clamping connection of this type is unsuitable for cell arresters.

The arrester may also be connected by welding, screwing, riveting or, if necessary, by gluing. Welding has the disadvantage of introducing heat. This should be avoided so as not to damage the cells. The screw connection also increases the complexity of assembly. Riveting also results in a more complex assembly process. Gluing is only partially suitable, due to the insulating effect of plastics, but is possible if special adhesives are used. With the exception of the screw connection, these joining methods are not among the detachable connecting techniques.

SUMMARY OF THE INVENTION

It is therefore an object of the present invention to provide an improved apparatus for the electrical connection of cell arresters.

The present invention is based on the understanding that an existing type of cell arrester may be assumed and utilized in order to establish an electrical connection between cell arresters.

The connecting terminal according to an embodiment of the invention can enable two arresters to be connected quickly and economically. No special tools are needed for this purpose. In addition, no load is placed on the arrester either during establishment of the electrical connection or while the connection is in place. The arrester connection may, for example, be a detachable connection. The connecting elements of the connecting terminal specifically match the arresters, which typically will not be changed.

In an embodiment, an apparatus for the electrical connection of cell arresters is provided that can include a first contact element having a first guide device and a second guide device, the first guide device being designed to rest against a first cell arrester and the second guide device being designed to rest against a second cell arrester; and a second contact element having at least one first holding device and at least one second holding device. The at least one first holding device being configured to surround the first guide device and the first cell arrester, and the at least one second holding device being configured to surround the second guide device and the second cell arrester.

The cell arresters may be arresters for galvanic cells, in particular battery cell arresters. Due to the guide devices coming to rest against the cell arresters, an electrical contact may be established between the guide devices and the cell arresters. The holding devices may surround the guide devices and the cell arresters in such a way that the guide devices and the cell arresters are pressed together. This makes it possible to guarantee secure electrical contacting between the cell arresters and the guide devices as well as the holding devices.

The second contact element may have a flat piece which is disposable between the cell arresters, and the at least one first holding device and the at least one second holding device are disposable on diametrically opposed sides of the flat piece. A contact element of this type is easy and economical to produce and provides a mechanically stable connection between the cell arresters.

The holding devices may each be designed as folded-over end pieces of the second contact element. The folded-over end pieces may thus each form a fold, which provides an easily established and yet detachable connection. The folded-over end pieces may be designed to have an oblique angle between 3° and 7° relative to the cell arresters. The oblique position makes it possible to provide an improved clamping connection between the cell arresters, guide devices and holding devices.

The first contact element may have a recess into which the flat piece of the second contact element is insertable. The first and the second contact elements may therefore be placed within each other during assembly According to an embodiment of the invention, the guide devices may each be designed as rails which may be oriented parallel to the cell arresters. The rails make it possible to adjust the apparatus to the cell arresters. The rails also enable electrical contacting of the cell arresters.

The guide devices may be designed in such a way that each of the two devices rests against an outside or an inside of the cell arresters. This provides a space-saving connection.

The apparatus may have a connecting element for providing a movable connection between the contact elements, the connecting element enabling a first position and a second position of the contact elements relative to each other, the holding devices not surrounding the guide devices and the cell arresters in the first position, but surrounding them in the second position. The apparatus may thus be mounted on the cell arresters in an open position for assembly. The apparatus may then be closed in order to establish a fixed connection to the cell arresters. For example, the connecting element may be a film hinge. A film hinge is economical to produce.

The apparatus may also have a projection disposed in an area of the connecting element, the projection extending away from the contact elements. The projection may facilitate handling of the apparatus and be suitable for electrical contacting.

The apparatus may also have a locking device which is designed to provide a fixed connection between the contact elements when the holding devices surround the guide devices and the cell arresters. This may guarantee a secure connection of the cell arresters. For example, the locking device may have a first locking element which is disposed on the first contact element and a second locking element which is disposed on the second contact element, and the first and second locking elements may be designed to provide a clamping connection between the contact elements. This makes it possible to establish the fixed connection when the contact elements are fixed in place. A connection of this type may also be advantageously detached in an easy manner.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
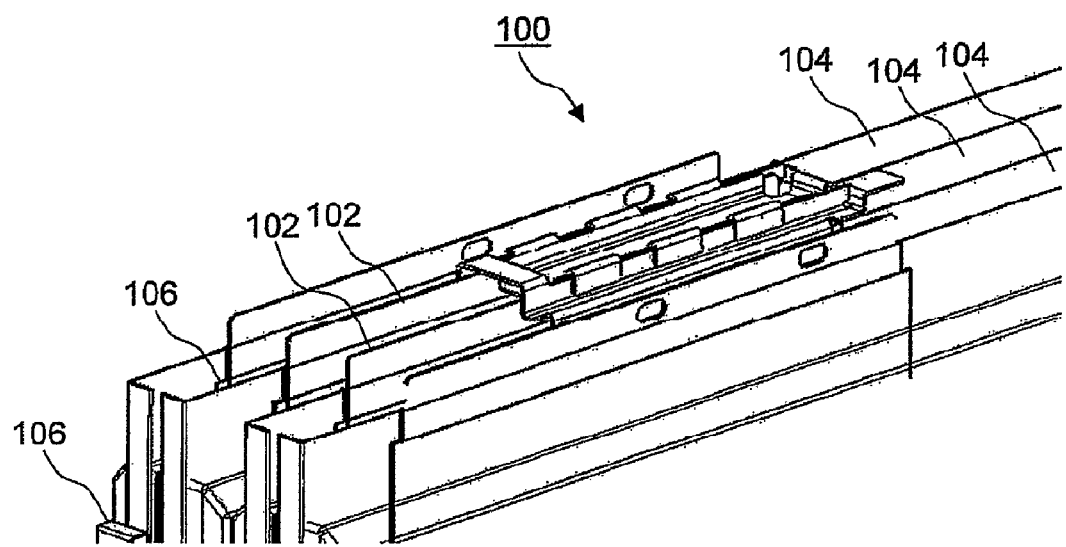
FIG. 1 shows a representation of battery cells, including an apparatus according to the invention.

In the following description of the preferred exemplary embodiments of the present invention, identical or similar reference numerals are used for the elements illustrated in the different drawings and having a similar function, these elements not being described repeatedly.

FIG. 1 shows an apparatus 100 for the electrical connection of cell arresters 102 according to an exemplary embodiment of the present invention. Cell arresters 102 may be battery cell arresters of a plurality of battery cells 104. Battery cells 104 may also be fastened to cooling fins 106, which, in turn, are disposable on a cooling plate in a uniform grid.

The cell arresters 102 can be designed as parallel plates. Apparatus 100 forms a contact bar which may be mounted on a side of cell arresters 102 diametrically opposed to battery cells 104. Apparatus 100 represents a direct connection between two battery cell arresters 102.

Figure 2:
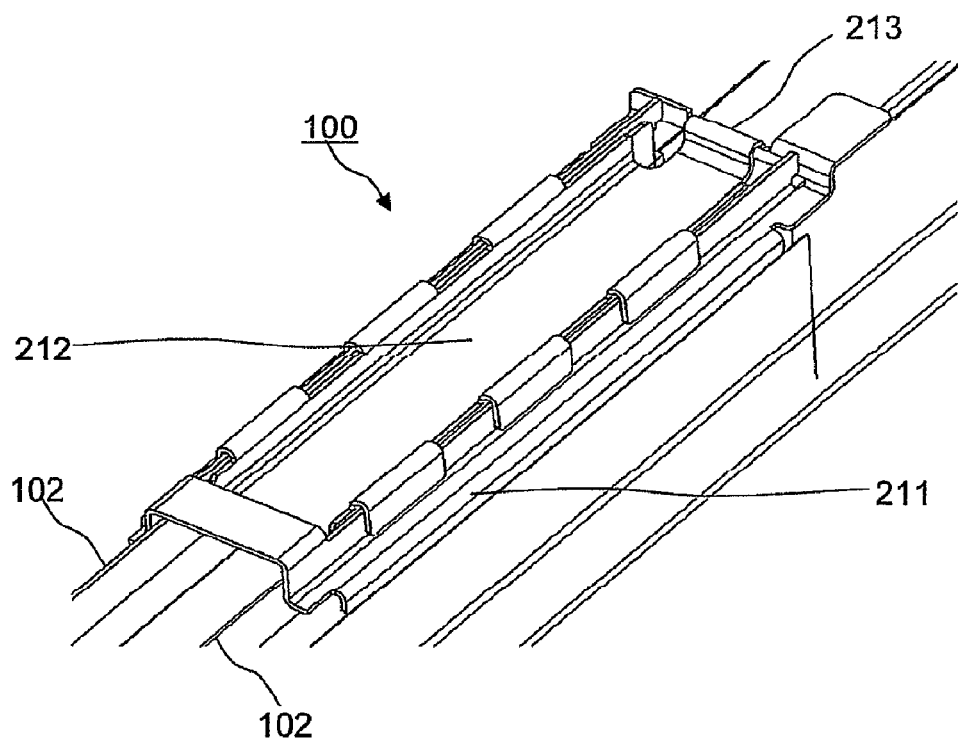
FIG. 2 shows a representation of the apparatus according to the invention.

FIG. 2 shows a detailed representation of an apparatus 100 for the electrical connection of cell arresters 102. Apparatus 100 has a first contact element 211 and a second contact element 212. First contact element 211 and second contact element 212 are movably connected to each other via a connecting device/element 213. Apparatus 100 may thus be mounted on cell arresters 102 in an open position for assembly. Contact elements 211, 212 of apparatus 100 may then be closed to establish a fixed connection to cell arresters 102.

Figure 3:
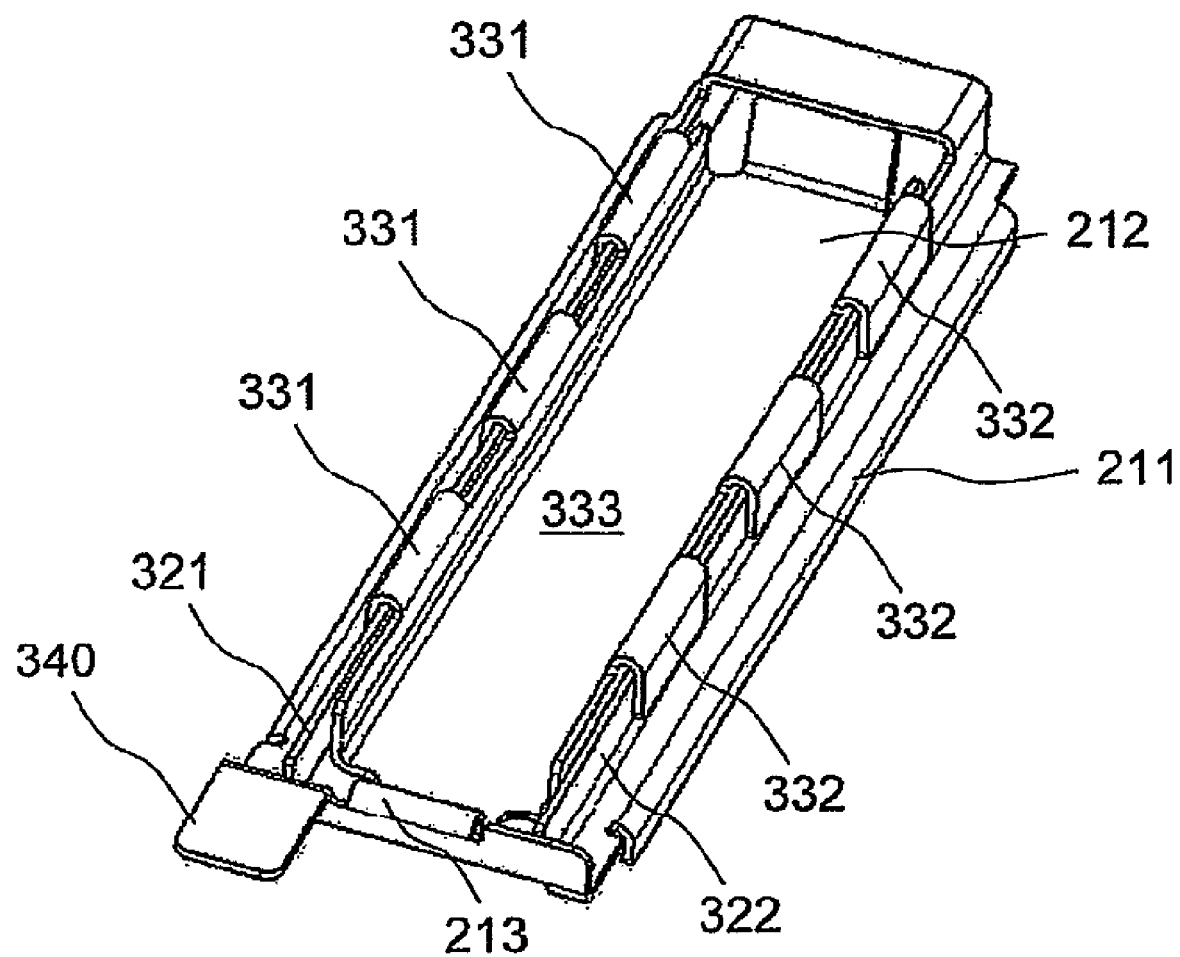
FIG. 3 shows a representation of the apparatus according to the invention, viewed from above.

FIG. 3 shows a top view of apparatus 100. Apparatus 100 has first contact element 211 and second contact element 212.

First contact element 211 may have a first guide device 321 and a second guide device 322. Guide devices 321, 322 may each be designed as rails which may be oriented parallel to the cell arresters. When assembled, guide devices 321, 322 may run lengthwise in relation to the end areas of the cell arresters and rest against a side of the cell arresters. First guide device 321 may be in direct contact with a first cell arrester and second guide device 322 may be in direct contact with an adjacent second cell arrester. For this purpose, guide devices 321, 322 are each disposable on the outside of the cell arresters. It is also possible to dispose each of guide devices 321, 322 on an inside of the cell arresters.

Second contact element 212 may have a plurality of first holding devices 331 and a plurality of second holding devices 332. First holding devices 331 are oriented parallel to first guide device 321, and second holding devices 332 are oriented parallel to second guide device 322. Second contact element 212 may also have a flat piece 333. First and second holding devices 331, 332 may be disposed on diametrically opposed sides of flat piece 333. According to this exemplary embodiment, holding devices 331, 332 are each designed as end pieces of flat piece 333 which are folded over to the outside. First contact element 211 has a recess into which flat piece 333 of second contact element 212 is insertable, as shown in FIG. 3. In this state, first guide device 321 and the first cell arrester are insertable into first holding device 331, and second guide device 322 and the second cell arrester is insertable into second holding device 332.

According to this exemplary embodiment, apparatus 100 also has a lug 340 for better handling and contacting. The lug may be designed as a flat projection of first contact element 211 and extend in the direction of the first cell arrester. Lug 340 may be disposed next to connecting device 213.

Figure 4:
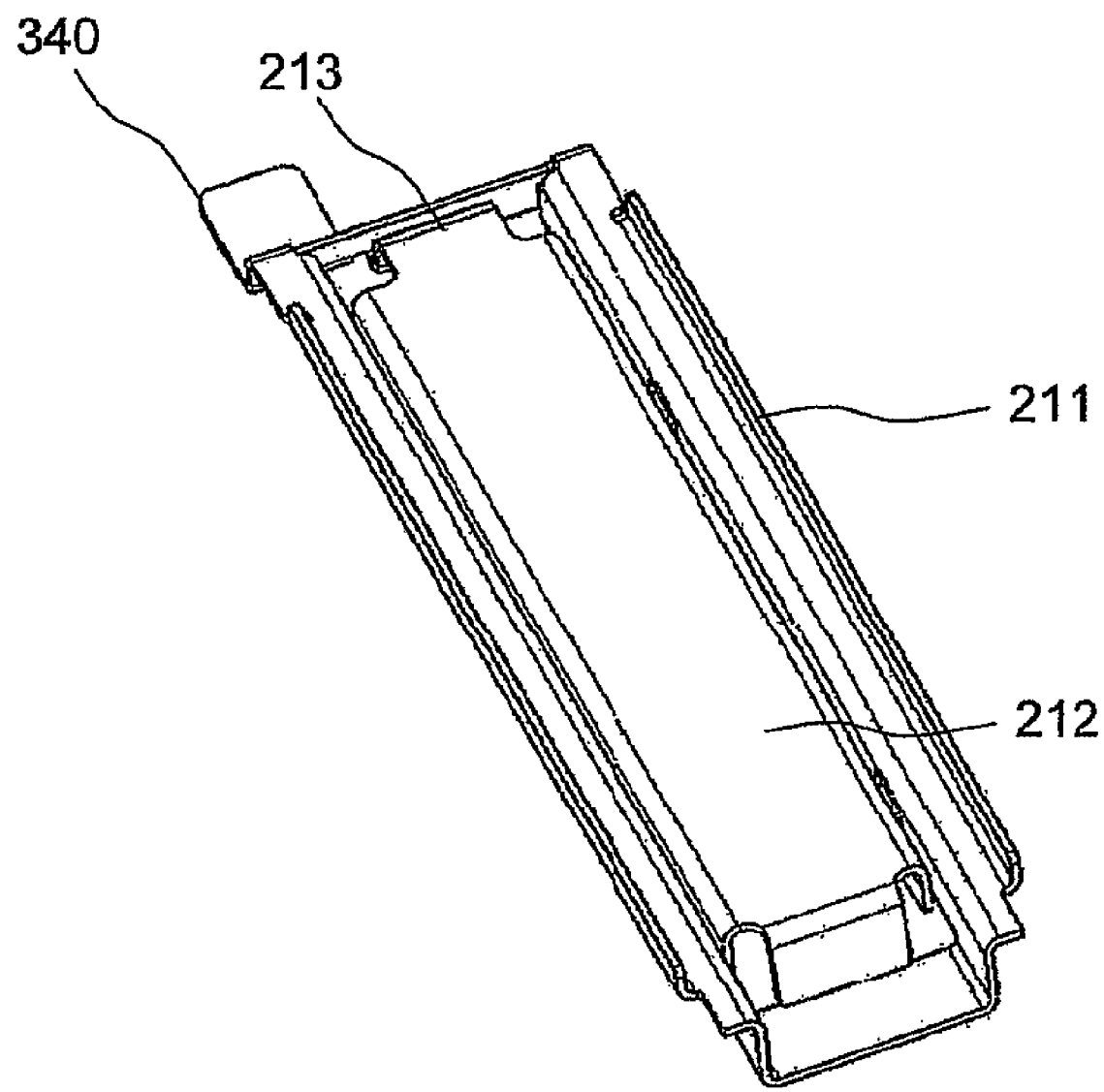
FIG. 4 shows a representation of the apparatus according to the invention, viewed from below.

FIG. 4 shows a bottom view of apparatus 100. Apparatus 100 has first contact element 211 and second contact element 212.

Figure 5:
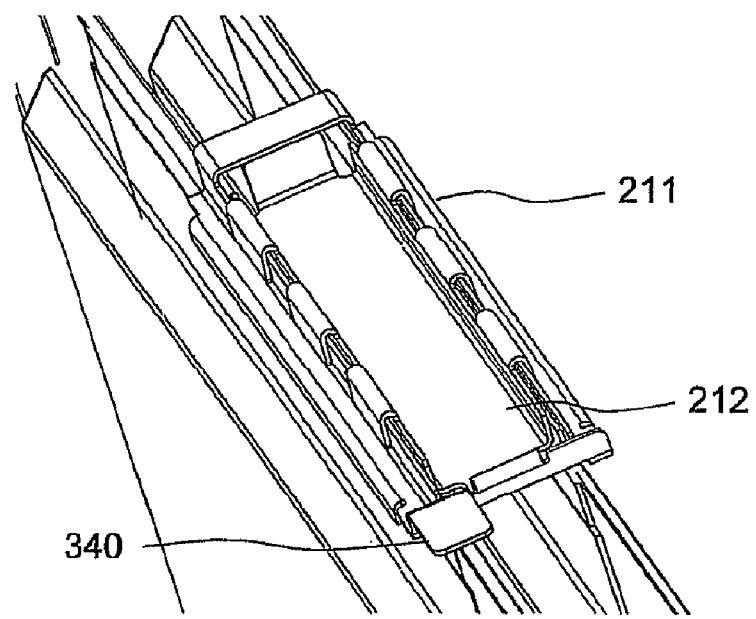
FIG. 5 shows a further representation of the apparatus according to the invention.

FIG. 5 shows a further representation of apparatus 100. The contact elements or connecting elements 211, 212 are made of a highly electrically conductive material such as gold, silver, aluminum, copper, copper-coated aluminum or the like. Connecting elements 211, 212 may have a thickness between 0.1 and 3 mm and be cut, for example, from a sheet. The cut sheet section contains recesses, which subsequently to being cut are folded over.

Arrester connecting element 212 may have recesses of a width in the range of 5 to 15 mm. Lug 340 on the top may be approximately 6 mm wide and 8.5 mm long. Lug 340 may be used for better handling and contacting of a cell supervision circuit (CSC) board.

The total length of this connecting element is unlimited and may be adjusted if arresters 102 are enlarged.

Figure 6:
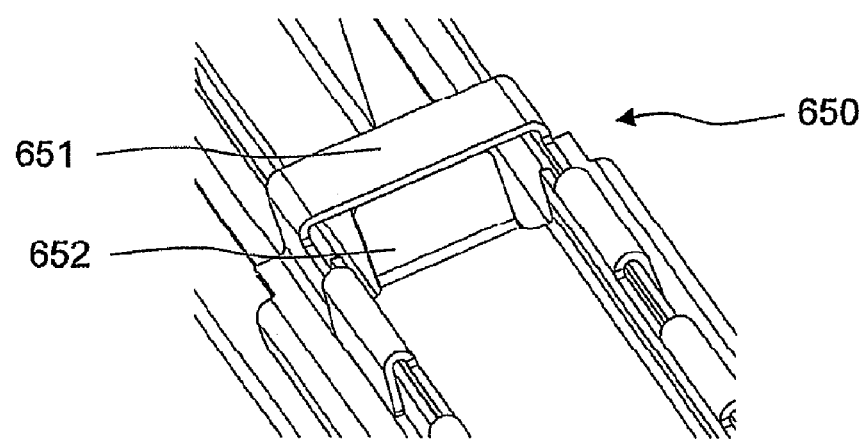
FIG. 6 shows a representation of the locking device according to the invention.

FIG. 6 shows a representation of a section of the apparatus according to the invention, including a locking device 650 according to one exemplary embodiment of the present invention. Locking device 650 is disposable on a side of the apparatus situated diametrically opposed to the connecting device. To provide the connection, locking device 650 may have a first locking element 651 and a second locking element 652. First locking element 651 may be designed as a connecting piece which is situated between the guide devices and passes over the cell arresters when the apparatus is assembled. First locking element 651 may be designed as an end piece of the second contact element which is folded over in the direction of second locking element 652. Second locking element 652 may engage with the first locking element 651 in order to provide the fixed connection.

Figure 7:
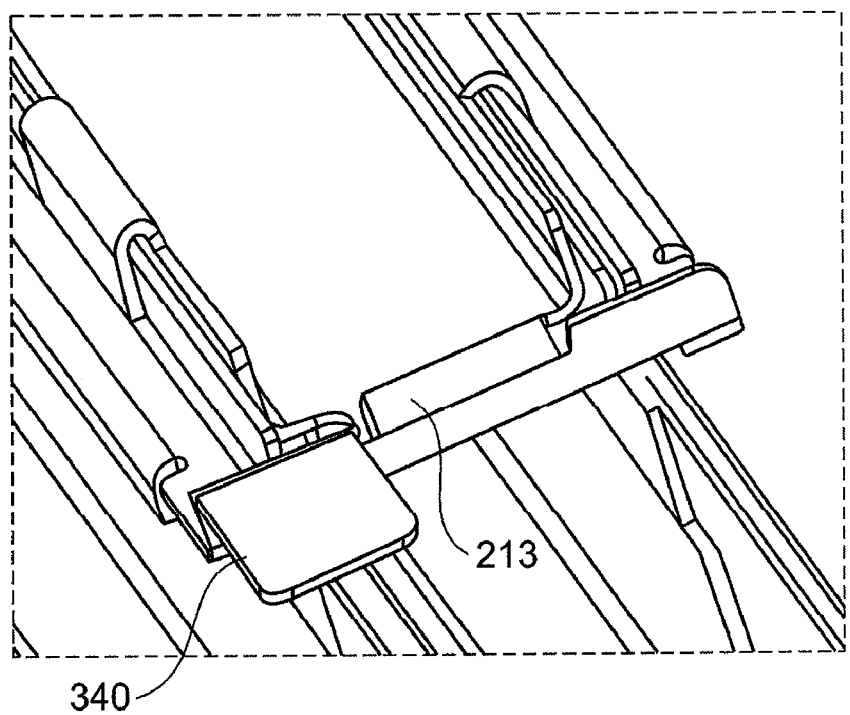
FIG. 7 shows a representation of the connecting device according to the invention.

FIG. 7 shows a representation of a further section of the apparatus according to the invention, including a connecting element 213 according to one exemplary embodiment of the present invention. Connecting element 213 is disposable in the center of the contact elements. Connecting element 213 may be designed as a hinge between the contact elements. In particular, connecting element 213 may be a film hinge. Connecting element 213 makes it possible to open and close the apparatus according to the invention. In a closed position, the contact elements may be oriented parallel to each other, and the holding devices may surround the guide devices and the cell arresters. The arrester connector according to the invention may thus be assembled by folding over film hinge 213 and subsequently fixing it in place.

Figure 8:
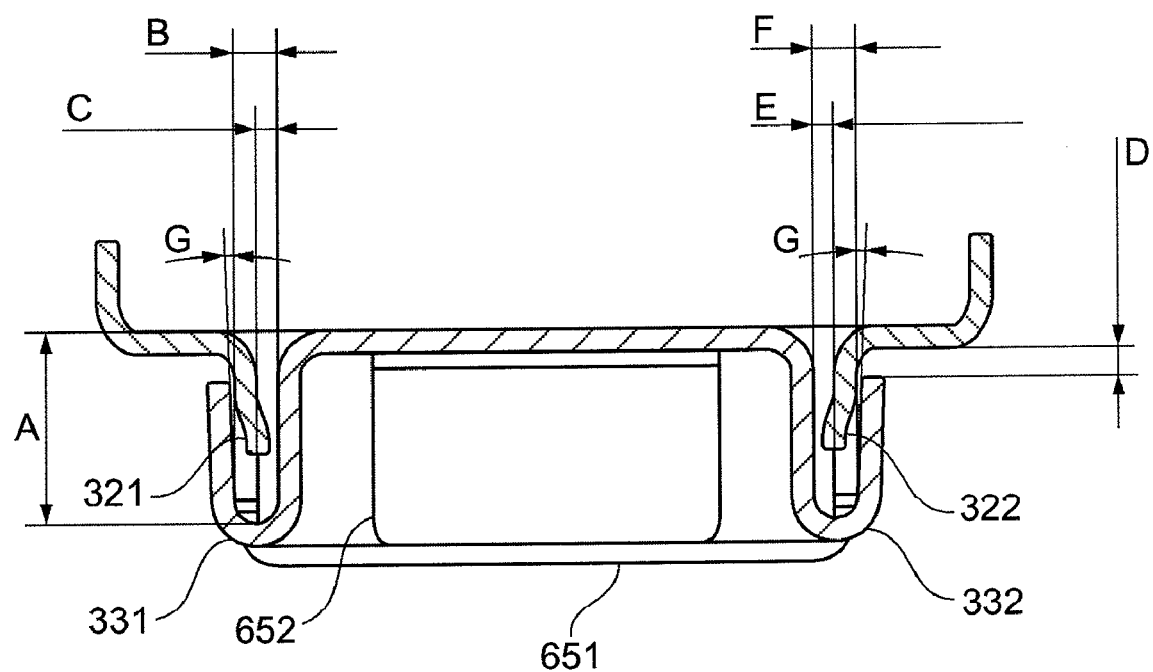
FIG. 8 shows a representation of the cross section of the apparatus according to the invention.

FIG. 8 shows a representation of a cross section of the apparatus according to the invention according to one exemplary embodiment of the present invention. Guide devices 321, 322 extend into holding devices 331, 332. The ends of guide devices 321, 322 each are bent toward the inside. A distance A shown in FIG. 8 may be 4.6 mm, a distance B may be 1 mm, a distance C may be 0.5±0.1 mm, a distance D may be 0.7 mm, a distance E may be 0.5±0.1 mm and a distance F may be 0.8 mm. An angle G may have a value of 3° and define an oblique angle of an end section of holding devices 331, 332 relative to the cell arresters. The clamping connection between the arresters and the connecting element is produced on the inside by an oblique angle based on angle G of approximately 3° to −7°.

The exemplary embodiments described have been selected only by way of example and may be combined with each other. The dimensions and shapes of the elements described have also been selected only by way of example and may be replaced by the same or a different number of elements having a similar function and also be adapted to cell arresters of a different type.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus configured to electrically connect cell arresters, the apparatus:
    a first contact element having a first guide device and a second guide device, the first guide device configured to rest against a first cell arrester and the second guide device configured to rest against a second cell arrester; and
    a second contact element having at least one first holding device and at least one second holding device, the at least one first holding device configured to surround the first guide device and the first cell arrester and the at least one second holding device being configured to surround the second guide device and the second cell arrester.

2. The apparatus according to claim 1, wherein the second contact element has a flat piece that is disposable between the cell arresters and wherein the at least one first holding device and the at least one second holding device are disposed on diametrically opposed sides of the flat piece.

3. The apparatus according to claim 1, wherein the first and second holding devices are each designed as folded-over end pieces of the second contact element.

4. The apparatus according to claim 3, wherein the folded-over end pieces are configured to have an oblique angle between 3° and 7° relative to the cell arresters.

5. The apparatus according to claim 2, wherein the first contact element has a recess into which the flat piece is insertable.

6. The apparatus according to claim 1, wherein the guide devices are each designed as rails which are oriented parallel to the cell arresters.

7. The apparatus according to claim 1, wherein each of the first and second guide devices are configured to rest against an outside portion or an inside portion of each cell arrester.

8. The apparatus according to claim 1, further comprising a connecting element for providing a movable connection between the first and second contact elements, the connecting element providing a first position and a second position of the first and second contact elements relative to each other, the first and second holding devices not surrounding the guide devices and the cell arresters in the first position, but surrounding them in the second position.

9. The apparatus according to claim 8, wherein the connecting element is a film hinge.

10. The apparatus according to claim 8, further comprising a projection disposed in an area of the connecting element and extending away from the contact elements.

11. The apparatus according to claim 1, further comprising a locking device configured to provide a fixed connection between the first and second contact elements when the first and second holding devices surround the first and second guide devices and the cell arresters.

12. The apparatus according to claim 11, wherein the locking device has a first locking element disposed on the first contact element and a second locking element disposed on the second contact element, and wherein the first and second locking elements are designed to provide a clamping connection between the contact elements.

* * * * *